Jan. 17, 1950  G. A. CHAPMAN  2,494,861
ELECTRICALLY HEATED AIRER
Filed Aug. 4, 1948  2 Sheets-Sheet 2
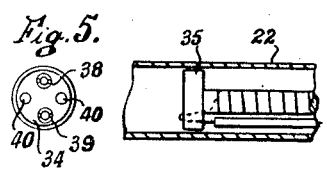
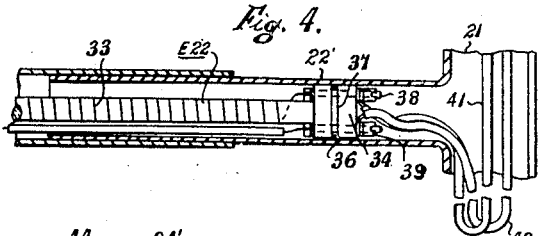
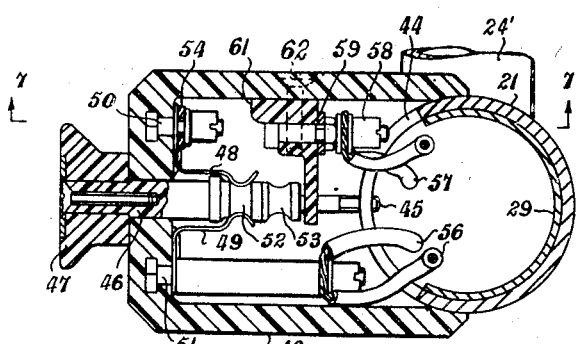
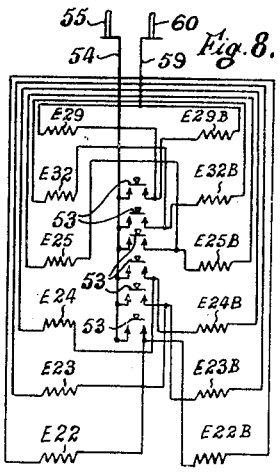
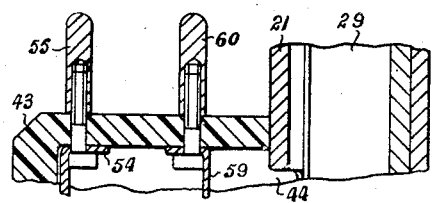
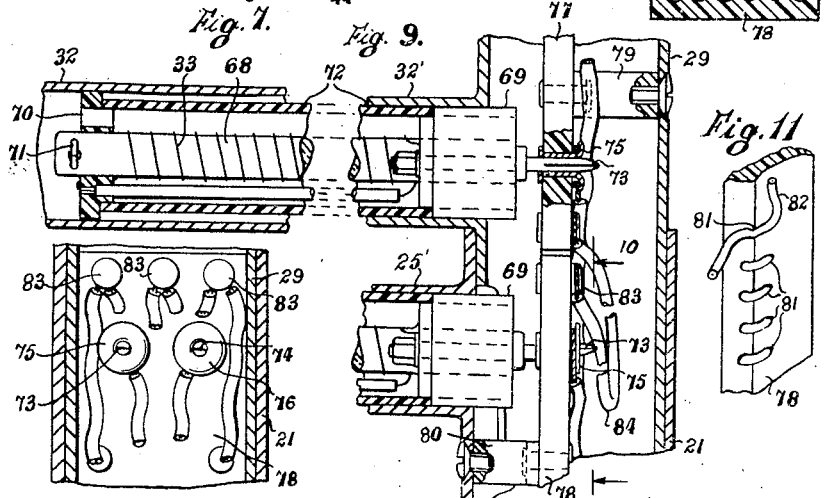
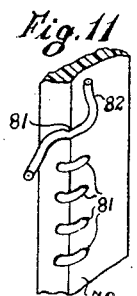
INVENTOR
GEORGE ALBERT CHAPMAN
by Richardson and David
Att'ys Patented Jan. 17, 1950

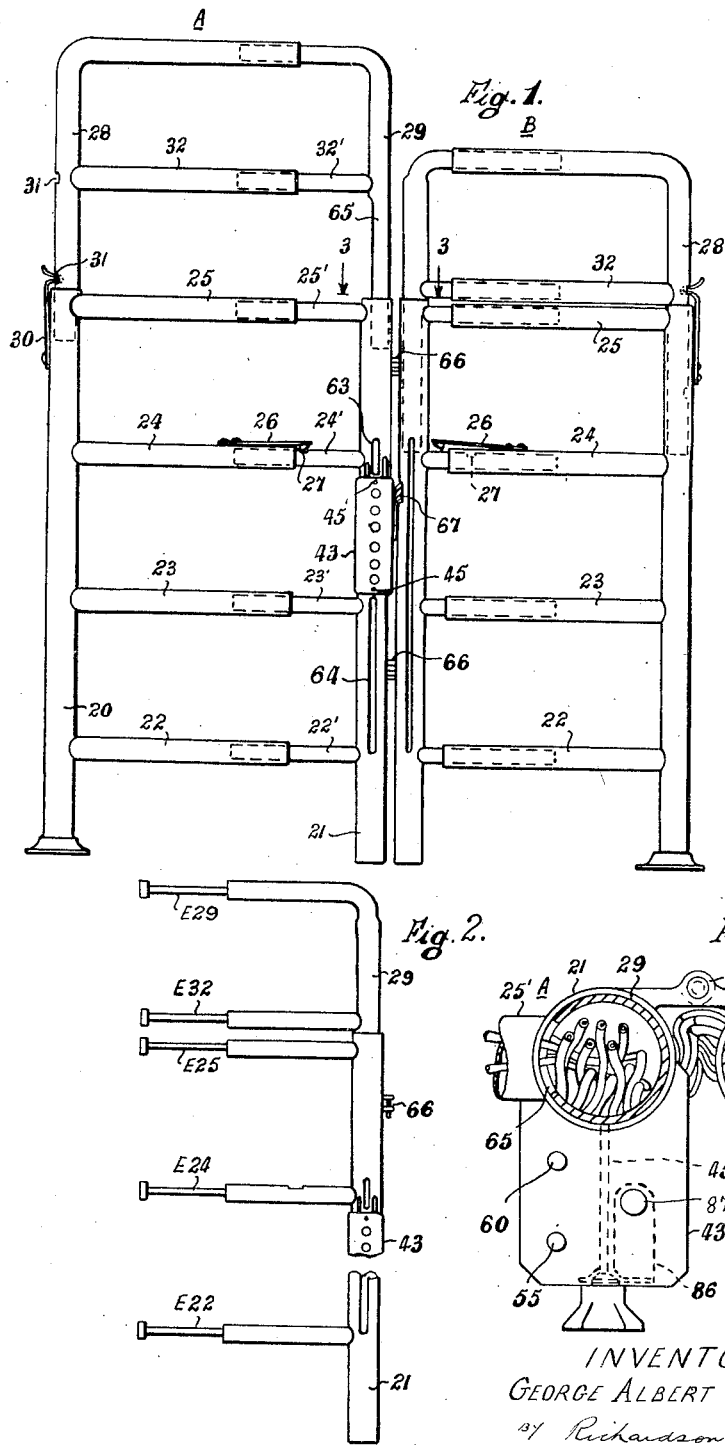

2,494,861

UNITED STATES PATENT OFFICE 2,494,861

ELECTRICALLY HEATED AIRER

George Albert Chapman, London, England

Application August 4, 1948, Serial No. 42,353
In Great Britain August 14, 1947

10 Claims. (Cl. 219—19)

This invention relates to electrically-heated airers for clothes, towels, linen and the like, and of the kind comprising a tubular frame composed of two upright members united by two or more horizontal rails placed one above another, the frame containing electrical heating means.

An object of this invention is to provide a transportable airer which is economical in power consumption, which is compact in relation to its airing capacity, and in which the electrical heating means are easily accessible for repair.

Another object is to provide an electrically-heated airer of the kind hereinbefore referred to with horizontal tubular rails of telescopic construction.

Another object is to make the upright members of the frame also of telescopic construction.

Another object is to provide convenient means for locating the heating elements in the telescoping rails.

Another object is to provide for independent control of the heating elements, of groups of elements forming an independently heated section of the frame, so that it is possible by suitably operating switches to heat only the sections of the frame required to be used.

Another object is to simplify the breaking and making of electrical connections when heating-elements are renewed.

An embodiment of the invention, and a modification thereof, will be described by way of example as applied to a clothes airer for domestic use, and with reference to the accompanying diagrammatic drawings, in which—

Figure 1 is a front elevation of the airer.

Figure 2 shows a part of the same airer detached from the remainder.

Figure 3 is a plan of a detail sectioned on the line 3—3 in Figure 1.

Figure 4 is a part-sectional front elevation of a part of the same airer.

Figure 5 is an end elevation of a heater element appearing in Figure 4, as seen from the right-hand side of Figure 4.

Figure 6 is a sectional plan of a control switch box.

Figure 7 is a sectional side elevation of the top part of the same box taken on the line 7—7 in Figure 6.

Figure 8 is a wiring diagram.

Figure 9 is a part-sectional front elevation showing a modification of parts of the device appearing in Figures 1 to 8.

Figure 10 is a side elevation sectioned on the line 10—10 in Figure 9.

Figure 11 is a perspective view of part of a member of this modification.

Figure 12 is a section of another part of the same member.

The clothes airer shown in Figure 1 consists of two generally similar frames A and B hinged together. The lower part of frame A consists of two tubular posts 20 and 21 of circular section. To the post 20 is welded one end of each of four rail tubes 22, 23, 24 and 25 of circular section placed horizontally one above another in a common plane. To the post 21 is welded one end of each of four rail tubes 22', 23', 24' and 25' of circular section and a close telescopic fit in the tubes 22—25. A catch consists of a spring blade 26 riveted to the tube 24 and having at its free end a tooth engageable in a notch 27 in the tube 24'. The tooth is bevelled so as to rise automatically out of the notch when the tube 24' is pushed into the tube 24, as in frame B in Figure 1. When the tubes 24 and 24' are extended, the tooth locks automatically in the notch and normally prevents the tubes from being parted. When the blade 26 is displaced abnormally, it allows the two sides of the frame to be separated.

The upper part of the frame includes two L-shaped tubes 28 and 29 of circular section and of such a diameter that one limb of each L is a close telescopic fit in the post tubes 20 and 21 of the lower part of the frame. The tube 29 has its horizontal limb of reduced diameter such that it is a close telescopic fit in the horizontal limb of the tube 28. A spring catch which enables the upper part of the frame to be locked at different heights, consists of a spring blade 30 riveted to the post 20 and bent to form a nose engageable in either of two notches 31 in the tube 28. The upper part of the frame also is provided with a telescopic rail 32, 32' similar to those of the lower part.

Each rail and the top horizontal member of the upper part accommodates a heating element. These elements, which are alike, are denoted as a whole by the reference letter E followed by the reference numeral of the rail in which any particular element is housed. Figure 4 shows by way of example the element E22 in the rail 22, 22'. The element consists of a refractory electrically insulating rod wound with a helix 33 of refractory resistance wire and having at its ends integral flanges 34 and 35. The flange 34 is rendered a push fit in the tube 22' by means of a split spring ring 36 which is located in a groove 37 around the flange and which bears against the inner surface of the tube. The flange 34 is provided with terminals 38 and 39 to which the ends of the heater wire are connected. Both of the flanges 34 and 35 are provided with perforations, such as 40 (Figure 5), which permit the movement of air along the rail. The flange 35 is a sliding fit in the tube 22.

Power is supplied to each heating element by flexible conductors such as 41, 42 in Figure 4, connected to the terminals 38 and 39. All the conductors lead to the same post 21, in which they are looped to provide the necessary slack and from which they are led to a terminal and switch box 43. This box is common to both frames and is attached to the post 21. The switches are of the push-pull type, placed one above another in positions corresponding to those of the heating elements which they control respectively. Each switch controls the heating of the corresponding rails in the two frames A and B.

The switch box 43 (Figures 3, 6 and 7) is a substantially rectangular open-backed box formed as a unitary moulding in electrically insulating material and fixed to the post 21, so as to cover an aperture 44 therein, by two screws 45 (Figures 1, 3 and 6) the heads of which are accessible at the front of the box. The head of the upper of the screws 45 seats on a grounding link 86 (Figure 3) embedded in the switch box 43 and electrically connected to a ground connector pin 87. Each of the six switches includes a plunger 46 of insulating material, slidable in a bearing in the front of the box 43 and terminating in a knob 47. Two spring contact blades 48 and 49 are fixed by bolts 50 and 51 in the box 43 and their free ends bear on opposite sides of the plunger 46. When the knob 47 is pressed in, as in Figure 6, the free ends of the blades lie in a groove 52 in the plunger. When the knob is pulled out, the blades snap into engagement with a grooved conducting ring 53 forming the inner end of the plunger. The blades 48 of the several switches are connected to a busbar 54 in turn connected to a live-line connector pin 55. Each blade 49 is connected by its bolt 51, to a pair of conductors 56 leading respectively to corresponding heating elements in the two frames. The return conductors from the same two elements, which are denoted in Figure 6 by 57, are connected by a terminal 58 to a busbar 59 connected to a neutral-line connector pin 60. The six terminals 58 and the busbar 59 are mounted on a angle-bar 61 of insulating material fixed in the box 43 by screws such as 62. For the sake of clearness, at most only a few of the conductors are shown in Figures 1, 2 and 4 to 7; however the arrangement of the wiring will be clear from the diagram shown in Figure 8.

In order to facilitate insertion of the wiring, the post 21 may be provided with longitudinal slots, such as 63 and 64, and the tube 29 is slotted at 65 so as to clear the conductors entering the rail tube 25'.

The frames A and B are connected together by hinges 66 (Figures 1 and 3), and the frame B differs from the frame A only in that the former carries no switch box and is provided with an aperture 67 for the entry of wires passing through a notch in the side of the switch box, as will be clear from Figure 3.

If any heating element requires servicing, it is only necessary to lower the top part of the faulty frame, raise the catch blade 26 clear of the notch 27 and part the two sides of the frame so that the elements are accessible for inspection, as shown in Figure 2. The connecting wires provide enough slack to enable the faulty element to be withdrawn clear of the inner rail tube and disconnected; a new element is then connected and partly inserted in the tube, and the two sides of the frame are re-engaged together.

The heating elements are preferably designed to operate at a fairly low temperaure—e. g. about 400° F. If desired, the heaters may be surrounded by shield tubes of fire clay or asbestos in order to prevent excessive local heating of the rails. Such a construction is shown in Figure 9. The heater wire 33 is wound helically on a core 68 integral with an end flange 69. A detachable end flange 70 is held on the core 68 by a pin 71 passing through a transverse hole in the core. The flanges 69 and 70 are stepped at their inner faces to provide locations for the ends of the shield tube 72.

In this example the terminals of the heater element are two connector pins 73 and 74 engaged in electrically conducting eyelets 75 and 76 inserted in a slat of electrically insulating material housed in the frame post. This slat is in two parts 77 and 78 mounted by brackets such as 79 and 80 in the post tubes 29 and 21. The part of the slat 78 opposite the apertures 44 covered by the switch box has notches 81 (Figure 11) in its edge into which are forced the wires terminating in the switch box. These wires, such as 82, extend along the slat, for example in channels, such as 85 (Figure 12), moulded therein, and are connected to one of the eyelets 75 and 76 or to a rivet 83 which is connected by a wire loop 84 to the appropriate terminal on the upper slat 77. The slat 77 may be channeled similarly to the slat 78 to accommodate the wires on it. This construction simplifies even further the renewal of the heating elements, which merely have to be plugged into the eyelets on the slats.

I claim:

1. An electrically-heated airer comprising a tubular frame including two upright members united by at least two horizontal rails placed one above another, said rails being of telescopic construction, electrical heating elements accommodated in said rails, and an electric circuit including switching means operable for selectively energising said heating elements, said rails having telescopic joints capable of being easily parted so that access to the heating elements is obtained by separating the two sides of the frame.

2. An electrically-heated airer comprising a tubular frame including two upright members united by at least two horizontal rails placed one above another, said upright members and said rails being of telescopic construction, and so arranged that at least one rail can be raised and lowered relatively to the remainder, electrical heating elements accommodated in said rails, and an electric circuit including switching means operable for selectively energising said heating elements, said rails having telescopic joints capable of being easily parted so that access to the heating elements is obtained by separating the two sides of the frame.

3. An electrically-heated airer comprising a tubular frame including two upright members united by at least two horizontal rails placed one above another, said rails being of telescopic construction, electrical heating elements mounted in the inner of the telescoping tubes of said rails and projecting into the outer of said tubes, and an electric circuit including switching means operable for selectively energising said heating elements, said rails having telescopic joints capable of being easily parted so that access to the heating elements is obtained by separating the two sides of the frame.

4. An electrically-heated airer comprising a tubular frame including two upright members united by at least two horizontal rails placed one above another, said rails being of telescopic construction, electrial heating elements mounted on the inner of the telescopic tubes of the rails and projecting into the outer of said tubes, a switch box mounted on the upright member of the frame that is provided with the inner of the telescopic rail tubes, the switch box being provided with at least two switches for controlling respectively two of said heating elements and electrical conductors passing inside the last-mentioned upright member between said switch box and said elements.

5. An electrically-heated airer comprising a tubular frame including two upright members united by at least two horizontal rails placed one above another, each of said rails comprising two telescoping tubes rigid respectively with said two upright members, a resilient catch on one of the tubes of one of said rails co-operating with an abutment on the other tube of said one rail to limit the lateral extension of said frame, said catch being releasable to enable the two sides of the frame to be parted, electrical heating elements mounted on the inner of the telescoping tubes of said rails and projecting into the outer of said tubes and an electric circuit including switching means operable for selectively energising said heating elements.

6. An electrically-heated airer comprising a tubular frame including two upright members united by at least two horizontal rails placed one above another, said rails being of telescopic construction, electrical connecting sockets in one of said upright members opposite the ends of said rails, electrical heating elements accommodated in said rails and provided with contact pins which are a push fit in said sockets, said rails having telescopic joints capable of being easily parted so that access to said heating elements is obtained by separating the two sides of said frame, and an electrical circuit for energising said sockets.

7. An electrically-heated airer comprising a tubular frame including two upright members united by at least two horizontal rails placed one above another, said rails being of telescopic construction, a slat of electrically insulating material fixed longitudinally in one of said upright members, electrical connecting sockets mounted on said slat opposite the ends of said rails, electrical heating elements accommodated in said rails and provided with contact pins which are a push fit in said sockets, said rails having telescopic joints capable of being easily parted so that access to said heating elements is obtained by separating the two sides of said frame, and an electrical circuit for energising said sockets.

8. An electrically-heated airer comprising a tubular frame including two upright members united by at least two horizontal rails placed one above another, said upright members and said rails being of telescopic construction, and so arranged that at least one rail can be raised and lowered relatively to the remainder, a slat of electrically insulating material in two parts fixed respectively in the two telescoping parts of one of said upright members, electrical connecting sockets mounted on said slat opposite the end of said rails, electrical heating elements accommodated in said rails and provided with contact pins which are a push fit in said sockets, said rails having telescopic joints capable of being easily parted so that access to said heating elements is obtained by separating the two sides of said frame, and an electrical circuit for energising said sockets.

9. An electrically-heated airer comprising a tubular frame including two upright members each provided with at least two rail tubes extending rigidly at right angles thereto, the rail tubes of one of said members being slidably fitted within the rail tubes of the other of said members to form horizontal rails, each of said rails accommodating an electrical heating element comprising one plug-shaped and a friction fit in the inner rail tube and the other end a free sliding fit in the outer rail tube.

10. An electrically-heated airer comprising a tubular frame including a first upright member provided with at least two rail tubes extending rigidly at right angles thereto, electrical contact sockets within said member opposite the ends of said rail tubes, two elongated electrical heating elements a close sliding fit in said tubes respectively, said elements having contact pins engaged in said contact sockets, and a second upright member provided with at least two rail tubes extending rigidly at right angles thereto and slidably fitted over the rail tubes of said first upright member, said elements being rendered accessible for disengagement from said contact sockets by separation of the rail tubes of said first member from the rail tubes of said second member.

GEORGE ALBERT CHAPMAN.

No references cited.